United States Patent [19]

Snead

[11] Patent Number: 5,215,422
[45] Date of Patent: Jun. 1, 1993

[54] TRAINING IDLER ASSEMBLY FOR SELF-UNLOADING TRAINS

[76] Inventor: Edwin d. Snead, 701 E. University Ave., Georgetown, Tex. 78626

[21] Appl. No.: 719,376

[22] Filed: Jun. 24, 1991

[51] Int. Cl.⁵ .............................................. B65G 67/24
[52] U.S. Cl. ................................... 414/339; 198/808; 198/861.2; 414/528
[58] Field of Search ................ 414/339, 528; 198/807, 198/808, 827, 830, 861.2

[56] References Cited

U.S. PATENT DOCUMENTS

| | | | |
|---|---|---|---|
| 1,572,555 | 2/1926 | Nelson | 198/808 |
| 1,815,099 | 7/1931 | Foote | 198/808 |
| 1,963,099 | 6/1934 | Robins | 198/808 |
| 2,664,994 | 1/1954 | Le Tourneau | 198/807 |
| 2,892,534 | 6/1959 | Ogden | 198/808 |
| 3,072,242 | 1/1963 | Poundstone | 198/808 X |
| 3,245,519 | 4/1966 | Reinemann | 198/806 |
| 3,301,384 | 1/1967 | Sewards | 198/808 |
| 3,368,665 | 2/1968 | Jinkins | 198/806 |
| 3,471,004 | 10/1969 | Ferlemann | 198/827 |
| 3,593,841 | 7/1971 | Leow | 198/808 X |
| 3,612,257 | 10/1971 | Goergen et al. | 198/830 X |
| 4,166,528 | 9/1979 | Renner | 198/827 X |
| 4,506,782 | 3/1985 | Jeanneret et al. | 198/806 |
| 4,732,267 | 3/1988 | Schober | 198/830 |
| 4,795,301 | 1/1989 | Snead et al. | 414/339 |
| 4,925,356 | 5/1990 | Snead et al. | 414/339 |

FOREIGN PATENT DOCUMENTS

| | | | |
|---|---|---|---|
| 662877 | 5/1963 | Canada | 198/808 |
| 2030592 | 12/1971 | Fed. Rep. of Germany | 198/808 |
| 742286 | 6/1980 | U.S.S.R. | 198/827 |
| 416367 | 9/1934 | United Kingdom | 198/808 |
| 773848 | 5/1957 | United Kingdom | 198/808 |

Primary Examiner—David A. Bucci
Attorney, Agent, or Firm—Harrison & Egbert

[57] ABSTRACT

A training idler assembly for a self-unloading train including a first hopper car, a second hopper car, a connector extending between the first hopper car and the second hopper car, a conveyor having a supply run and a return run underlying the first and second hopper cars, and a conveyor training assembly rotatably mounted to the connector. The connector allows relative angular movement of the first and second hopper cars. The conveyor training assembly supports the conveyor. The conveyor training assembly causes an angular adjustment of the conveyor relative to the angular movement of the first hopper car with respect to the second hopper car. The conveyor training assembly is an idler assembly which is rotatably mounted to the connector between the first and second hopper cars. The idler assembly includes a first training idler assembly which supports the supply run of the conveyor and a second training idler assembly supporting the return run of the conveyor. The first training idler assembly is connected by a first strut to one of the hopper cars. The second training idler assembly is connected by a second strut to another of the hopper cars. The first and second idler assemblies rotate independently of each other.

16 Claims, 5 Drawing Sheets

TRAINING IDLER ASSEMBLY FOR SELF-UNLOADING TRAINS

TECHNICAL FIELD

The present invention relates to a train for the transportation of bulk commodities. More particularly, the present invention relates to trains having conveyor systems built thereon. The present invention also relates to idler assemblies used for the training of such conveyor systems.

BACKGROUND ART

Rail transportation is generally recognized as being more economical than truck transportation for bulk commodities such as aggregates. Large quantities of such commodities can be moved by a small crew at low costs. However, rail transportation frequently loses out in competitive situations because of the cost of unloading, stockpiling, and delivering the commodity to the ultimate location. Rail transportation also loses out in competitive situations because of the difficulty in delivering the product to a desired location.

Even though large quantities of bulk material can be transported at low costs from one terminal to another, the burden is placed on the unloading facility to maintain the economics of this method of transportation for the purchaser of the commodity. Even if the unloading is slow, the train is therefore delayed for a substantial period of time for the unloading to be accomplished. There is an added investment cost per ton handled for the use of the railroad equipment. One problem, in this regard, is that rail transportation is a twenty-four (24) hour operation while many of the industries it serves operate only during daylight hours. Often, a train makes good speed from origin to destination, only to be delayed for several hours waiting to be unloaded. Each hour of delay adds to the transportation costs as much as an additional twenty-five (25) miles of haul.

As an example of the efficiency of rail transport for bulk commodities, a train with a two-man crew pulling 1600 net tons at 55 miles per hour would be producing 32 times as many ton-miles per hour as a dump truck driver hauling 25 tons at 55 miles per hour.

Another problem that has affected the efficiency of rail transportation for bulk commodities is that, under current methods, the quick unloading of a commodity train requires high capacity equipment and facilities which are idle most of the time. Such high-capacity equipment and facilities are expensive and add significantly to the investment costs per ton handled.

In the past, there have been many methods that have been used for the unloading of bulk materials from trains. For example, bottom dumping hopper cars are equipped with automatic doors that are opened automatically as the cars move over a pit, where the pit facility includes a feeder and a conveyor. Either a pit or an elevated trestle is required for this method, so that this method is ruled out at many locations. Obviously, the providing of a pit or trestle facility with associated conveyor systems is expensive. Another method involves the use of rotary car dumpers. These are commonly used for unloading coal and electric generating plants. Once again, the equipment for unloading the cars is highly specialized and expensive. Side dumping cars have been also used for many years. These side dumping cars, however, cannot be dumped on level ground. They require an elevated truck or a built-up embankment, for example, so that the dumped material will flow over the side of the embankment and not flow back over the track. In addition, backhoes or other loading equipment are used to unload standard gondola cars. These methods are generally slow, promoting the delay problems mentioned hereinabove.

A significant development in the unloading of hopper cars occurred with the invention of U.S. Pat. No. 4,925,356, issuing on May 15, 1990, to the present inventor and to William B. Snead. U.S. Pat. No. 4,925,356 disclosed a self-unloading train for the transfer of bulk commodities that comprises a plurality of hopper cars, a train conveyor, and a gating system. The plurality of hopper cars are coupled together to form a train. Each hopper car has at least one hopper having walls inclined at shallow angles to the vertical and a bottom discharge opening having a width at least 50% of the distance between the wheels of the hopper cars. The train conveyor is an endless belt supported on the cars and underlies each of the hopper discharge openings. This endless belt receives the material discharged from the hopper discharge openings. The train conveyor extends the length of the plurality of hopper cars. The train conveyor has a width that is substantially greater than the width of the discharge openings. The gating systems are operable selectively so as to discharge material from the hoppers onto the train conveyor. In particular, these gating systems are made up of clamshell-type gates that are pivotted about the axis parallel to the train conveyor. These clamshell-type gates assist in controlling the flow of material onto the train conveyor.

Each of the hopper cars of this invention has a center sill. The return run of the conveyor belt is supported by split return idlers disposed along each side of the center sill. The supply run of the conveyor belt is supported by catenary troughing idlers disposed immediately above the return run. A suitable drive system is provided for the train conveyor and the transfer conveyor. The drive system includes electric drive motors for the conveyor, a generator for providing electric power to the drive motors, and an internal combustion engine for driving the conveyor.

The actual embodiment of U.S. Pat. No. 4,925,356 has been very successful in actual operation. After extended use, it was found that this "DUMP TRAIN" should normally be unloaded on straight sections of track. Since the Dump Train has a substantial length, it was found that a limitation to the use of the Dump Train was that the Dump Train could not be unloaded on curved sections of track. If the train was unloaded on a curved section of track, then a great deal of deflection and distortion of the conveyor belt would occur. Any deflection or distortion of the conveyor belt could minimize the effectiveness of the Dump Train and could cause excessive wear and damage to the conveyor belt. In many areas of the country, and in many desired unloading locations, such long straight sections of track are not readily available. As such, a need developed for enabling the Dump Train to be unloaded on curved sections of track. This adds greatly to the effectiveness of the Dump Train concept, opens more markets for the use of the Dump Train, and allows the Dump Train to be increasingly flexible to the needs of the user.

In the past, there has not been great experimentation with conveyor belts for traversing curves. Except in the specialized application of the Dump Train, it is much simpler for conveyor designers to design straight sections of conveyor belts which discharge onto adjacent straight sections of conveyor belt. There has seldom been a need for designing a curved section of conveying equipment.

It is an object of the present invention to provide a self-unloading train t hat is suitable for discharging material from curved sections of track.

It is another object of the present invention to provide a conveyor guide system that resists deflection and distortion of the conveyor belt when operating on curves.

It is another object of the present invention to provide a training idler assembly that can be easily adapted for use on self-unloading trains.

It is still a further object of the present invention to provide a training idler assembly for a self-unloading train that is economical and easy to operate.

These and other objects and advantages of the present invention will become apparent from a reading of the attached specification and appended claims.

SUMMARY OF THE INVENTION

The present invention is a training idler assembly for a self-unloading train for bulk commodities. The self-unloading train of the present invention comprises a plurality of hopper cars, a conveyor underlying each of the hopper cars and extending therebetween, and a conveyor training assembly positioned along the conveyor so as to support the conveyor. The conveyor receives the discharge from the hopper cars and transfer this discharge to another location. The conveyor training assembly allows an angular adjustment of the cônveyor relative to the orientation of the hopper cars along a section of railroad track.

Each of the plurality of hopper cars is coupled together so as to form a train. Each of the hopper cars has a bottom discharge opening overlying the conveyor. Each of the hopper cars also has a connector extending to an adjacent hopper cars. This connector allows relative angular movement between the hopper cars. The conveyor training assembly is rotatably mounted to this connector. The conveyor is a belt which has a supply run and a return run. The return run of the conveyor belt is supported by split return idlers disposed alongside the center sill of the hopper cars. A supply run of the conveyor belt is supported by catenary training idlers disposed along the return run.

The conveyor training assembly includes an idler assembly which is positioned between adjacent hopper cars. The idler assembly supports the conveyor belt in the area between the hopper cars. The idler assembly is movable in relation to the orientation of adjacent hopper cars. The idler assembly is rotatably mounted to a surface of the drawbar/connector. The assembly, in particular, includes a first troughing idler assembly that supports a supply run of the conveyor and a second troughing idler assembly which supports a return run of the conveyor. Both the first troughing idler assembly and the second troughing idler assembly are rotatable about a common central axis. The first troughing idler assembly is flexibly connected to a first frame. The second troughing idler assembly is connected to a second frame. The second frame is arranged interior of the first frame. The first frame, and the associated idler assembly, is rotatable independently of the second frame and its associated idler assembly.

The first troughing idler assembly comprises three idlers which are flexibly connected in end-to-end relationship. The three idlers extend between the ends of the frame. The second troughing idler assembly comprises a first idler rotatably mounted to one end of the second frame, a second idler rotatably mounted to another end of the second frame, and a roller rotatably mounted within the second frame and extending between the first and second idlers. The first and second idlers extend downwardly endwardly at an angle so as to "trough" the return run of the conveyor belt. The first and second idler assemblies are arranged slightly higher than the idler assemblies on each of the hopper cars so as to be placed in frictional contact with the supply and return runs of the conveyor means. A first hopper car of the plurality of hopper cars is connected to the first troughing idler assembly. Similarly, a second hopper car is connected to the second troughing idler assembly. A strut extends between the hopper cars and their respective idler assemblies. A relative movement of the first hopper car with respect to the second hopper car causes relative and independent movement between the first troughing idler assembly and the second troughing idler assembly. The change of orientation of the idler assemblies assists in enabling the conveyor belt to traverse curves.

DETAILED DESCRIPTION OF THE INVENTION

Figure 1:
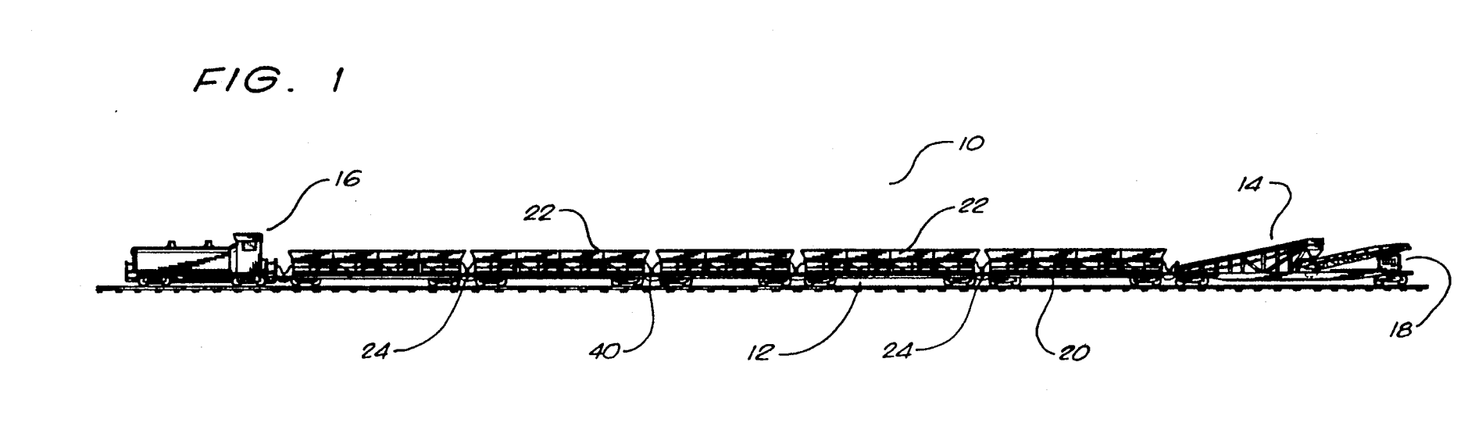
FIG. 1 is a view, in side elevation, of the complete self-unloading train of the present invention.

Referring to FIG. 1, there is shown a side view of the self-unloading train 10 in accordance with the present invention. Self-unloading train 10 includes a plurality of hopper cars 12, a discharge car 14, a locomotive 16, and a control cab 18. The plurality of hopper cars 12 have an underlying conveyor 20 for the receipt of material from the hoppers 22 of the hopper car configuration 12. These hopper cars are detachably connected to locomotive 16. The discharge car 14 is connected to the hopper cars 12 for transferring material from the underlying conveyor 20.

The train 10, according to the present invention, may be referred to as a "unit train", in the sense that the cars of the train are permanently coupled together by connectors 24. The cars are not uncoupled unless it is necessary to remove one of the cars to a service facility. The connectors 24 are typically drawbars which are pivotally connected between each of the hopper cars 12. This allows each of the hopper cars 12 to have angular movement, around curved sections of track, in relation to an adjacent hopper car. The self-unloading train 10, according to the invention, is particularly suitable for the transport of aggregates. Although the train illustrated in FIG. 1 shows a total of five hopper cars, in a typical operation the train 10 would have a total of ten or more hopper cars. The illustration of the five hopper car configuration is for the convenience of illustration.

The hopper cars 12 are designed to support an endless belt train conveyor 20 which traverses the length of the train 10 including the hopper cars 12 and a portion of the discharge car 14. The train conveyor 20 underlies the discharge gates of the hoppers.

Figure 2:
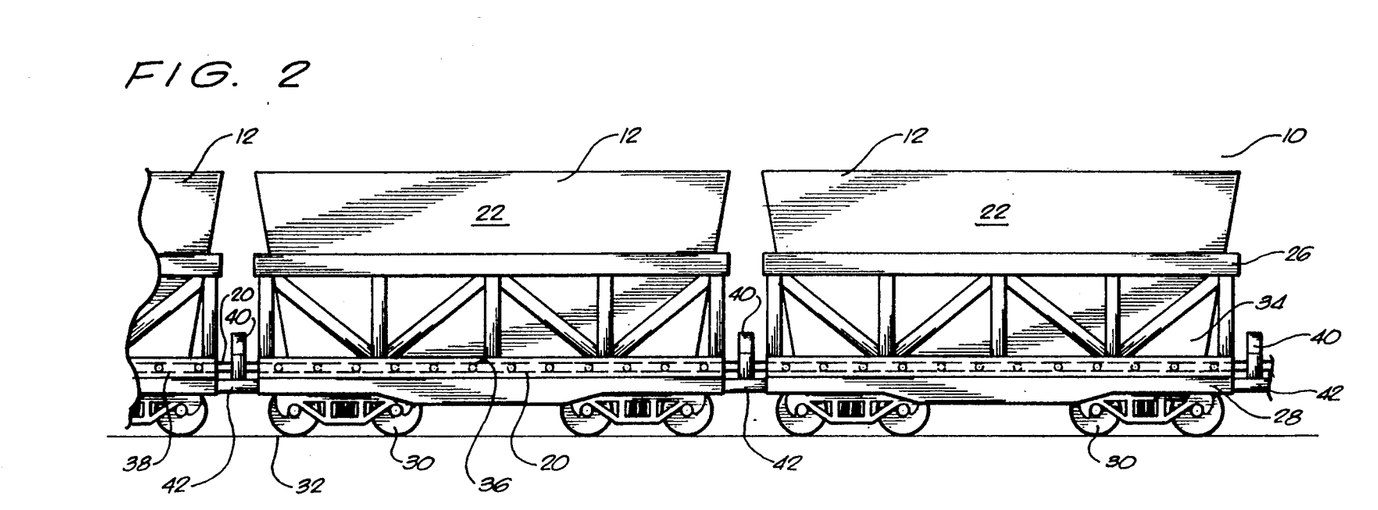
FIG. 2 is a side view of two hopper cars of the self-unloading train showing, in particular, the conveyor running therethrough.

Referring to FIG. 2, it can be seen that the hopper cars 12 are of a generally conventional construction including a main frame 26 consisting of a center sill and sidebeam members 28. The frame 26 is supported on suitable trucks 30 on a track 32 in a conventional manner. While this particular form of basic rail car structure is illustrated, it will be understood that the hopper car may be constructed using other known techniques where the center sill is eliminated. Each of the hopper cars has a bottom discharge opening 34 that is quite wide and long. The discharge opening 34 is closed by suitable clamshell gate members (not shown) consisting of a pair of coacting members which are movable toward and away from each other in a direction transverse to the longitudinal axis of the hopper car 12. The underlying conveyor 20 has a width substantially greater than that of the hopper discharge openings. The conveyor 20 includes a supply run 36 and a return run 38. The supply run is the upper run of an endless belt conveyor and is supported in the form of a trough. This trough confronts the discharge openings 34 of hoppers 22. The return belt is supported immediately under the supply belt in a flat condition. In particular, the return run 38 of the belt 20 is supported by split return idlers disposed alongside the center sill of the hopper cars 12. The supply run 36 of conveyor belt 20 is supported by catenary troughing idlers disposed above the return run 38.

With reference to FIG. 1, the locomotive 16 is detachably connected to the plurality of hopper cars 12. Locomotive 16 is a conventional railroad locomotive that has sufficient horse-power to pull the loaded hopper cars 12. The locomotive 16 is coupled to the self-unloading train 10 so as to pull the train along a set of tracks.

In normal operation with the self-unloading train of the present invention, the conveyor belt 20 is placed in taut condition just prior to the discharge of materials. The belt can be tightened by the actuation of a suitable hydraulic mechanism on the trailer car 14. This serves to extend the conveyor belt so that there is little slack in the belt during the discharge of materials. The arrangement of the catenary troughing idlers (which receive the conveyor belt) serve to form the toughing condition of the belt during the receipt of the discharge materials. After the discharge of materials is completed, the hydraulic actuated mechanism is released so that the belt becomes slack. This allows the train to traverse curved and irregular track during the course of delivery. In the normal operation of aggregate delivery, the unit train 10 will pass along straight sections of track and curved sections of track. If the belt remains taut during the curved sections, the deformation and distortion created by the curving of one hopper car 12 with respect to another hopper car 12 would create undesirable forces which would deform, stretch and, possibly, tear the conveyor belt 12. Additionally, the configuration of the self-unloading train 10 would normally be unsuitable for discharge on curved sections of track. The tightening of the belt on a curved section of track would also tend to distort and deform the belt with respect to the idlers and with respect to the position of the belt below the hopper discharge openings 34.

In order to overcome the problem of the operation of the conveyor belt 20 on curved sections of track, the present invention incorporates the training idler assembly 40. As can be seen, the training idler assembly 40 is positioned between adjacent hopper cars 12. It can also be seen that the training idler assembly 40 receives the supply run 36 and the return run 38 of conveyor belt 20. In FIG. 2, it is shown that the drawbars 42 serve as the connectors between individual hopper cars 12. The drawbars 42 provide a surface upon which the training idler assembly 40 can be mounted in rotational relationship therewith. Each of the drawbars 42 allows a pivotting and angular adjustment of one car with respect to another car while on curved sections of track. It is the training idler assembly 40, of the present invention, that allows the operation of the self-unloading train 10 on curved sections of track. The training idler assembly 40 accommodates certain curvature and belt distortion while providing a pathway for the discharge of materials.

As will be described hereinafter, the purpose of the training idler assembly 40, of the present invention, is to "steer" the conveyor belt toward the center line of the hopper cars when the self-unloading train 10 is unloading on a curved track. Belt tension causes both the supply run 36 and the return run 38 of conveyor belt 12 to travel to the side of the car which is on the inside of the curve. This is most apparent between two cars since the cars form an angle of less than 180° when sitting on curved track. The belt always tries to follow the path of least resistance or the path of shortest distance. Since the cars are straight, when the belt enters a car biased to one side or the other, the belt tends to stay on that particular side.

Conventional training idlers steer belts on straight conveyors by creating a lateral force across the entire width of the belt. The force is not applied only to the edge of the belt because this would merely deform the belt locally and have little effect on the centering of the belt. Normally, steering is accomplished by skewing a roller which the belt has made contact at some angle not perpendicular to belt travel. A lateral force is thereby created by the new axis of rotation of the roller surface and friction between the belt. The amount of angular orientation, in the past, has been controlled by mechanical or electrical sensing devices. They would send a signal to an actuating link attached to the roller.

Figure 3:
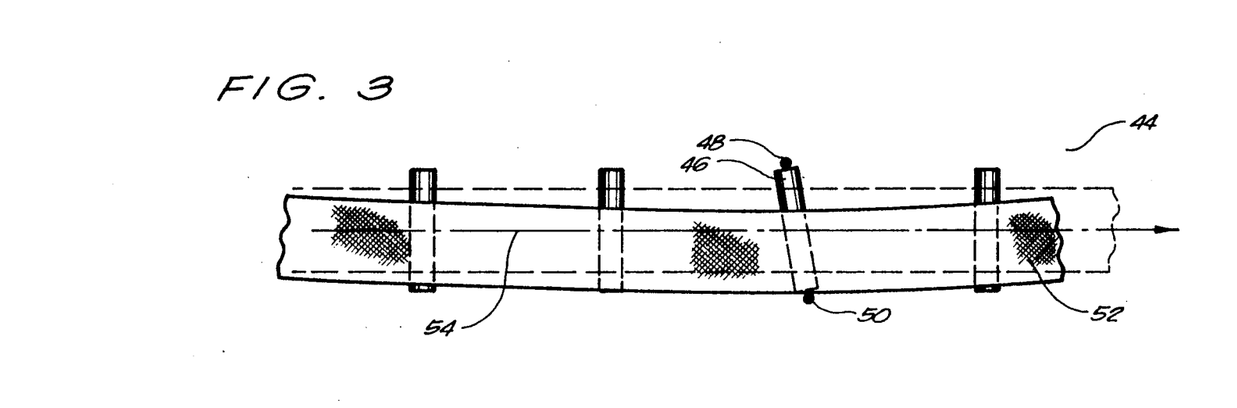
FIG. 3 is an illustration showing the manner in which the conveyor belt can be deflected so as to traverse a curve.

FIG. 3 illustrates the simplest form of "self-training". The system 44 illustrated in FIG. 3 shows an idler 46 which can pivot at its center and has two guide rolls 48 and 50 at each end. When the belt 52 drifts to one side (as illustrated in solid line) because of an uneven load, the guide roll 50 is dragged in the direction of belt travel which, in turn, skews the idler 46 and causes a lateral force on the belt toward the center line 54 of conveyor belt 52. As such, the system illustrated in FIG. 3 tends to accommodate the skewing or angular deflection of a conveyor belt.

Figure 4:
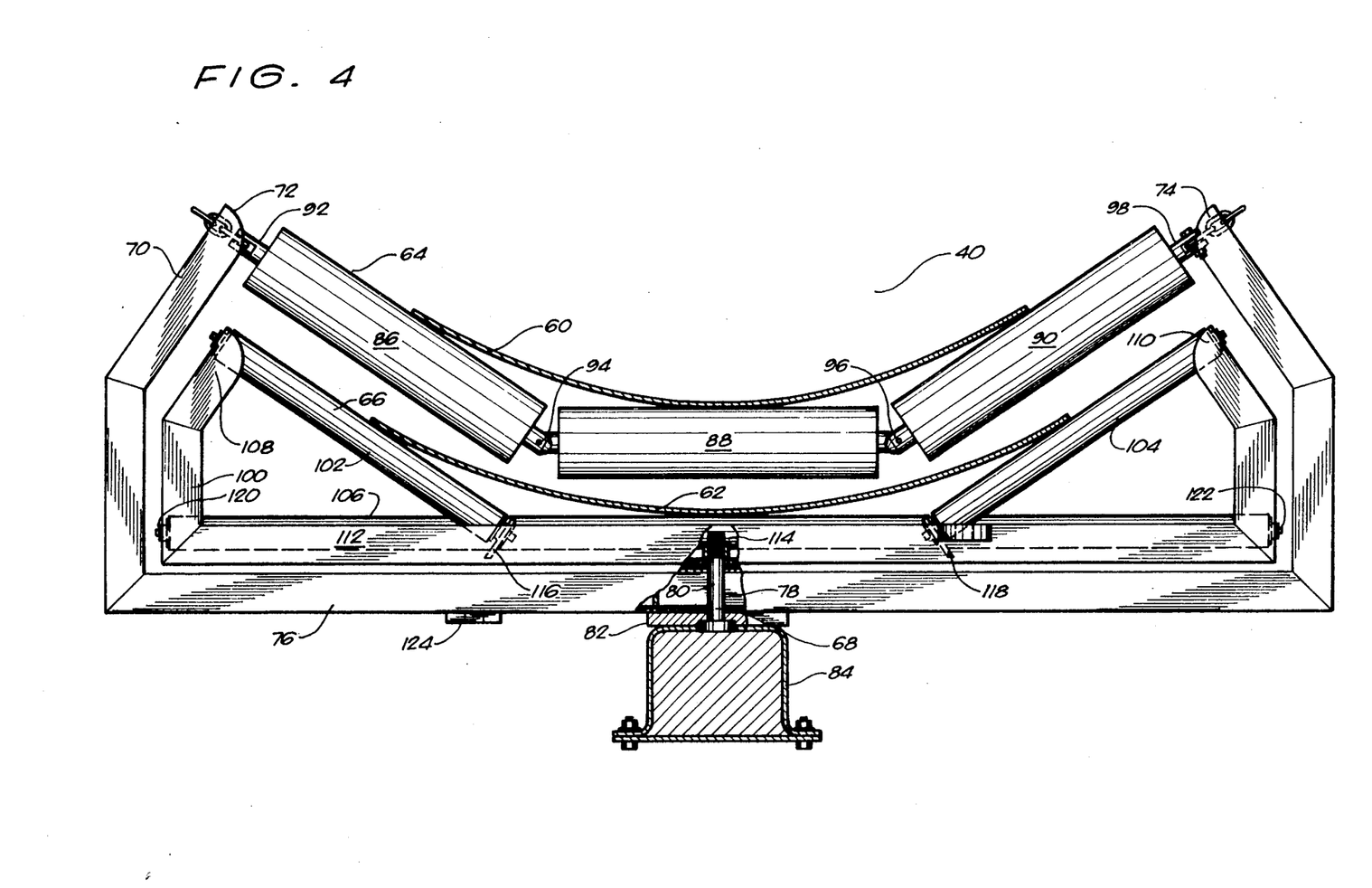
FIG. 4 is an end view showing the conveyor training assembly in accordance with the preferred embodiment of the present invention.

FIG. 4 shows a detailed view of the training idler assembly 40 of the present invention. As can be seen, the training idler assembly 40 receives the supply run 60 and the return run 62 of an endless conveyor belt. The training idler assembly 40, as illustrated in FIG. 4, includes a first troughing idler assembly 64 and a second troughing idler assembly 66. As can be seen, at least along straight sections of track, the second troughing idler assembly 66 is positioned within and below the first troughing idler assembly 64. It can also be seen that the first troughing idler assembly 64 and the second troughing idler assembly 66 are rotatable about a common axis 68. In particular, the first and second troughing idler assemblies 64 and 66 are rotatable with respect to each other and independent of each other.

The first troughing idler assembly 64 comprises a frame 70 having a first end 72 and a second end 74 The first frame 70 has a generally U-shaped configuration. The frame 70 extends from first end 72 outwardly and downwardly to a generally horizontal member 76. Horizontal member 76 is rotatably connected about axis 68. In particular, the horizontal member 76 includes a suitable structure 78 which receives and extends around pin 80 at central axis 68. As such, the first frame 70 is free to rotate about the central axis 68. The central axis 68 includes a support member 82 which is mounted onto the drawbar 84. The drawbar 84 extends between adjacent hopper cars.

The first idler assembly 64 further includes a plurality of troughing idlers which are flexibly interconnected together. It can be seen that the first troughing idler assembly 64 has idlers 86, 88, and 90 connected together. Idlers 86, 88, and 90 are rotatable about their longitudinal axes. The idler 86 has a generally cylindrical configuration and is connected to the first end 72 of frame 70 by connector 92. Idler 86 is hingedly connected to central idler 88 at 94. Central idler 88 is connected at 96 in hinged relation to the idler 90. Idler 90 is connected by connector 98 to the second end 74 of frame 70. As can be seen, the idlers 86, 88 and 90 assume a "troughed" configuration. The supply run 60 of the conveyor belt will, under load, also assume the troughed configuration of the idlers 86, 88 and 90. In order to effect the purposes of the present invention, the configuration of the first troughing idler assembly 64 should be raised slightly from the level of the catenary troughing idlers which are disposed on the conveyor belt 20 on each of the hopper cars 12. This will create a somewhat "pressurized" frictional engagement between the surfaces of the idlers 86, 88 and 90 and the underside of the supply run 60 of the conveyor belt.

In actual operation, it can be seen that the frame 70 is free to rotate with respect to the drawbar 84 on the central axis 68. As the frame 70 is rotated, the first troughing idler assembly 64 will exert forces onto the belt so as to cause the belt to adjust for any curvature in the belt.

The second troughing idler assembly 66 includes a second frame 100, a first idler 102, a second idler 104, and a roller 106. The second frame 100 has a first end 108 and a second end 110. The second frame has a generally U-shaped configuration and includes a horizontal member 112 which extends parallel to the horizontal member 76 of the first frame 70 and is rotatably connected to the drawbar 84 at central axis 68 by members 114. As such, the frame 100 is free to rotate about the central axis 68 in relation to the forces imparted upon the frame 100 and the associated troughing assembly.

The first idler 102 is a cylindrical member and is rotatably mounted to the first end 108 of the second frame 100. The first idler 102 extends angularly downwardly and inwardly and is rotatably received at end 116. As such, the first idler 102 is free to rotate about its central longitudinal axis. The second idler 104 is rotatably mounted to the second end 110 of frame 100. The second idler 104 is a cylindrical member which extends angularly downwardly from the second end 110 of frame 100. The second idler 104 extends inwardly in the same fashion as idler 102. Idler 104 is rotatably connected to member 118 such that the idler 104 is free to rotate about its central longitudinal axis. Members 116 and 118 are connected to frame 100.

It can further be seen that the second troughing idler assembly 66 includes a roller 106 which is rotatably connected to the second frame 100. Roller 106 is rotatably connected to the frame 100 at end 120. The other end of roller 106 is rotatably connected at end 122 to frame 100. The roller 106 is a generally cylindrical member which freely rotates about its central longitudinal axis and extends between the first idler 102 and the second idler 104.

The configuration of the second training idler assembly 66 also creates a troughing arrangement for the return run 62 of the conveyor belt. The edges of the conveyor belt 62 will be in contact with the first idler 102 and the second idler 104. The central and bottom portion of the return run 62 will be in contact with the roller 106. As can be seen, the second training idler assembly 66 is positioned interior of the first training idler assembly 64.

It should be noted that it is important that the first and second troughing idler assemblies frictionally engage the underside of the conveyor belt. This frictional engagement promotes the "steerability" of the conveyor belt between adjacent hopper cars. As such, the surface of the idlers, preferably, should be coated with a high-friction material, such as rubber.

As will be described hereinafter, a connector 124 is provided on the bottom surface of the horizontal member 76 of the first frame 70. Connector 124 will engage a strut which is attached to an adjacent hopper car. The relative movement of the hopper car which is connected by the strut to the connector 124 will create angular movement of the first training idle assembly 64 with respect to the drawbar 84. Such adjustments will allow for certain curvature to occur within the supply run 60 of the conveyor belt.

Figure 5:
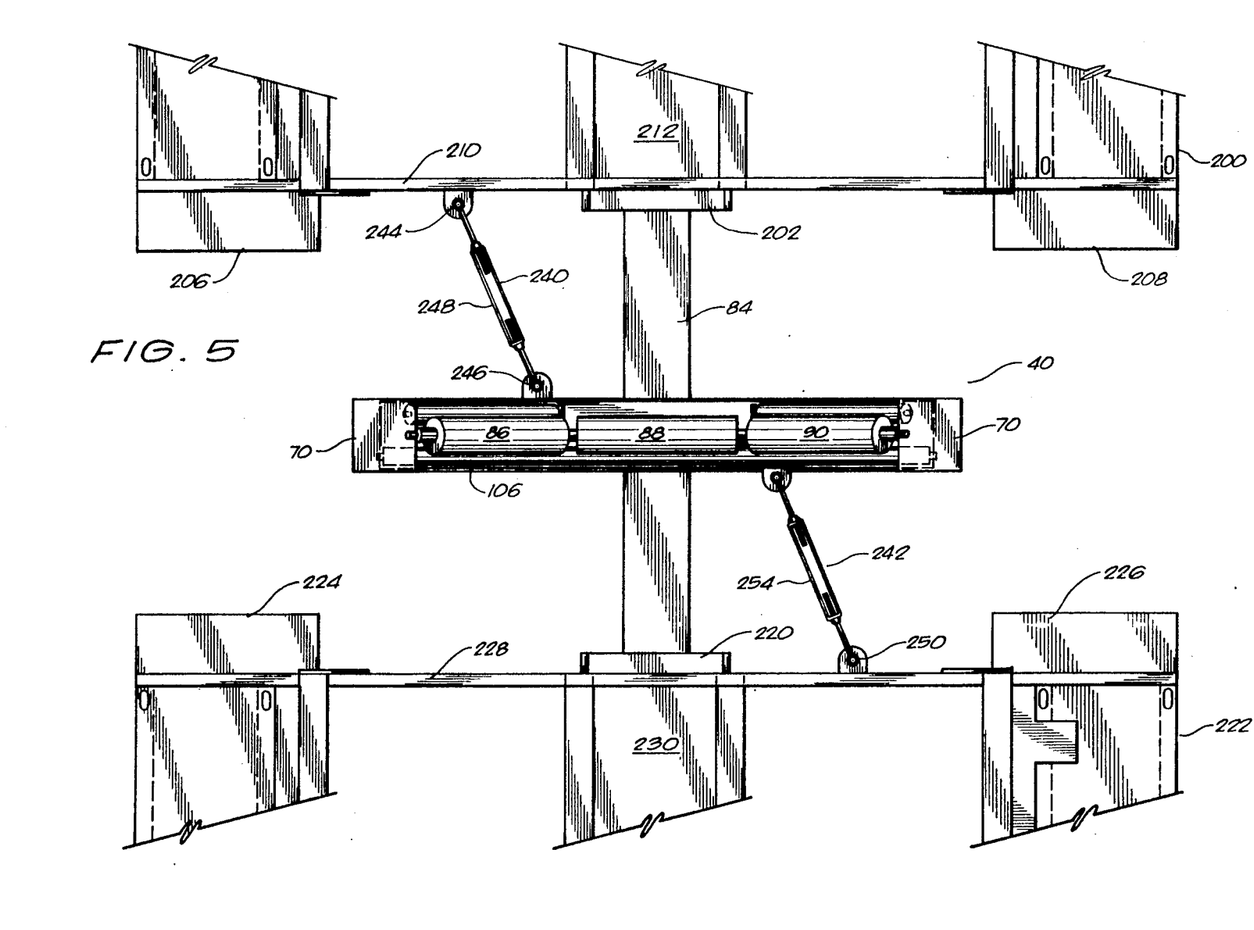
FIG. 5 is a top view of the conveyor training assembly of the present invention.

FIG. 5 is a top view showing the arrangement of the idler assembly 40. It can be seen that the idler assembly 40 is rotatably connected to the connector 84 (otherwise known as the drawbar). The drawbar 84 is pivotally connected to the first hopper car 200 at joint 202. Joint 202 may be a ball joint which allows the first hopper car 200 to deflect angularly with respect to the drawbar 84. It can be seen that the first hopper car 200 has side sills 206 and 208. A surface 210 extends between the side sills 206 and 208. The surface 210 extends across the rear portion of the hopper car 200 and acts as a portion of the frame of the hopper car. Center sill 212 extends along the central longitudinal axis of the hopper ca 200 and further acts as the frame of the hopper car. The center sill 212 is aligned with the connector 84.

Drawbar 84 is connected, at its other end, to joint 220 on the second hopper car 222. Joint 220 is a joint similar to joint 202 of the first hopper car 200. Second hopper ca 222 includes side sills 224 and 226. A second surface 228 extends between the side sills 224 and 226. Second surface 228 forms a rear surface on the frame of the hopper car 222. A center sill 230 is generally aligned with the drawbar 84.

In FIG. 5, the training idler assembly 40 of the present invention is shown without the conveyor belt in position. It can be seen that the training idler assembly 40 has a generally rectangular frame 70. Rectangular frame 70 represents the first frame which receives the troughing idlers 86, 88, and 90. Additionally, it can be seen that the roller 106 is slightly offset from the position of the idlers. Roller 106 extends across the frame.

In FIG. 5, the configuration of the present invention is illustrated in a normal position in which the first hopper car 200 and the second hopper car 222 are positioned on a relatively straight section of track. As such, the first frame 70 will generally be aligned with the second frame 100. In this position, there is little or no deflection of the conveyor belt. In order to accommodate situations in which a deflection will occur and in which the hopper cars 200 and 222 will be angularly offset from each other, the present invention incorporates the use of struts 240 and 242. Strut 240 is connected at one end to clevis 244 which is attached to the surface 210 at the end of the hopper car 200. The strut 240 extends angularly inwardly and is in connection with the clevis 246 which is attached to the first frame 70. It can be seen that a turnbuckle 248 is provided as part of the strut 240. Turnbuckle 248 can be used to achieve certain minor adjustments in the distance between the frame 70 and the surface 210. It can also accommodate any manufacturing errors or tolerance modifications that may be necessary. In normal operations, the turnbuckle 248 can be rotated so as to close the distance between the frame 70 and the surface 210. Additionally, it can be seen that the strut 240 extends angularly inwardly between points 244 and 246. As such, the angular inclination of the strut 240 creates a "magnification" effect. As such, the first frame 70 can be rotated about its point of rotation on the drawbar 84 in greater proportion than the angular offset of the surface 210 with respect to the drawbar 284. This "magnification" effect enhances the utility of the first troughing idler assembly 64 with respect to the supply run 60 of the conveyor belt.

In a similar manner, the strut 242 is connected at one end to the clevis 250 and at the other end to the clevis 252. Clevis 250 is attached to the second surface 228 of the second hopper car 222. The clevis 252 is attached to the second frame 100 of the idler assembly 40. A turnbuckle 254 is provided so as to adjust the length of the strut 242.

Figure 6:
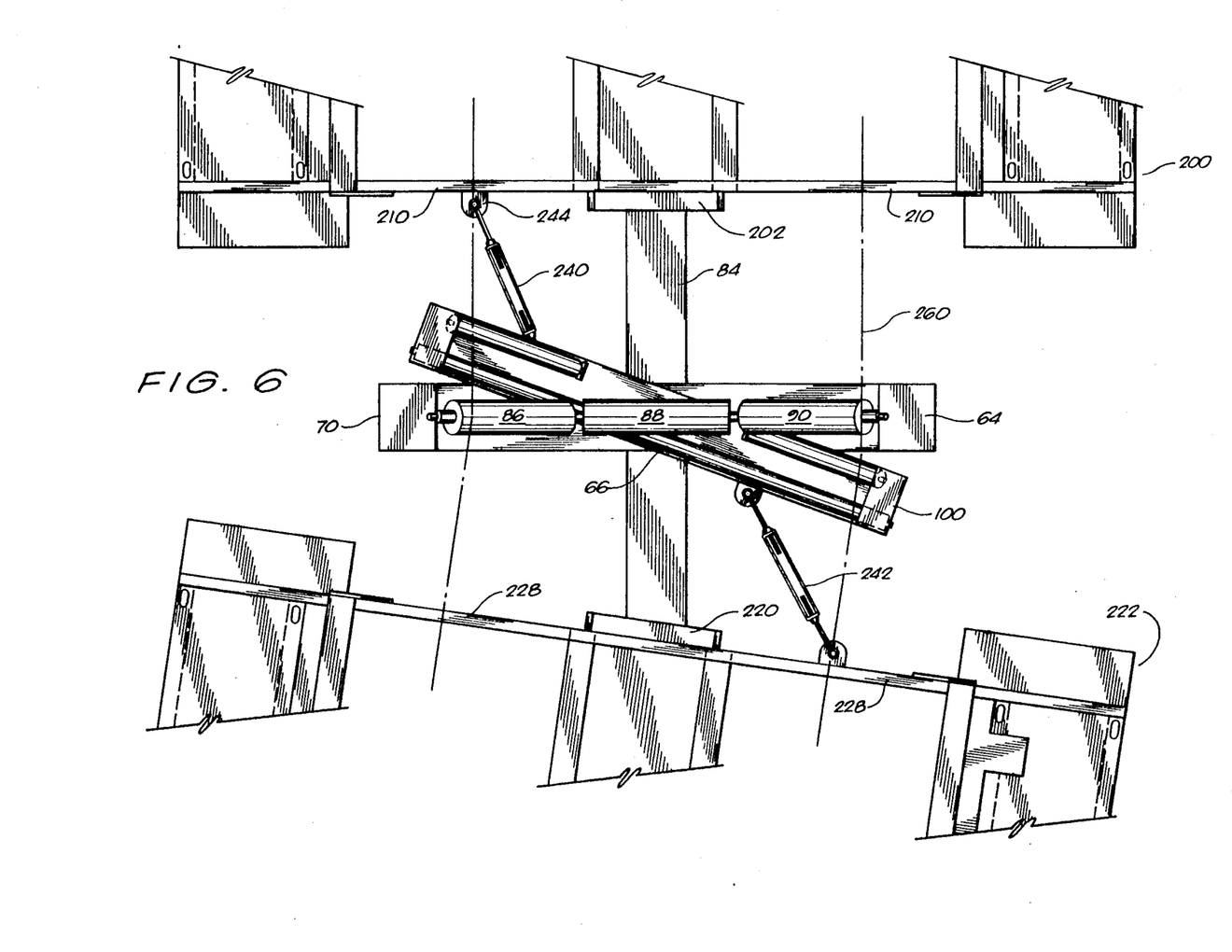
FIG. 6 is a top view illustrating the operation of the conveyor training assembly of the present invention.

FIG. 6 shows the operation of the present invention. Initially, it can be seen that the first hopper car 200 is angularly offset with respect to the second hopper car 222. As can be seen, the drawbar 84 has pivotted slightly at joints 202 and 220. Since the surface 210 of the first hopper car 200 is at a slightly inward angle with respect to the second hopper car 222, the surface 210 will cause the clevis 244 to angle inwardly. This action, in turn, pushes the strut 240 such that the frame 70 of the first training idler assembly 64 is rotated about the pivot point on the drawbar 84. As can be seen, the idlers 86, 88 and 90 are arranged at an angle. A conveyor belt 260 (illustrated in dotted line fashion) extends across the first troughing idler assembly 64. The forces exerted on the conveyor belt 260 cause the belt to gently curve from the first hopper car 200 to the second hopper car 222. As such, the orientation of the conveyor belt 260 is appropriately altered so as to accommodate the angular displacement of the hopper car 200 with respect to the hopper car 222.

In addition to the action as to frame 70, the end surface 228 of hopper car 222 will also be deflected. This will cause the strut 242 to move inwardly. This causes the second frame 100 of the second troughing idler assembly 66 to be drawn toward the surface 228 of the second hopper car 222. As such, this adjustment accommodates the return run of the conveyor belt 260. Since the supply run and the return run of conveyor belt 260 will deflect in different directions based upon the curvature of the track, it is necessary for the return run to be oriented in a different manner than the supply run of the conveyor. The separate troughing idler assemblies, as provided by the training idler assembly of the present invention, allow the supply run and the return run of the conveyor to be oriented properly.

The present invention allows the "self-training" of the conveyor belt by providing a system which creates a lateral force on the belt toward the center line of the conveyor. As can be seen, one link is connected to the supply run training idler assembly. The other link is connected to the return run training idler assembly. The training idlers, top and bottom, are especially designed to accommodate the geometry of the self-unloading train. These idlers pivot independently of each other. The need to pivot independently is based on the fact that the return belt travels in the opposite direction of the supply belt. However, each must be trained toward the center of the hopper cars. When the self-unloading train 10 enters curved track, the linkage steers the training idlers proportionately according to the angle form between the two adjacent cars.

The return belt is troughed in the second troughing idler assembly 66. It is troughed because a troughed idler tends to center the belt. The centering occurs because of gravity and other forces. When used on a pivotal training idler, it also ensures that the belt stays in contact with the training idler roller surface.

After use, it has been found that the training idler assembly of the present invention is extremely functional on curves. The present invention allows the self-unloading train, commonly known as the "Dump Train", to unload on curves. The belt can be tightened without causing the belt to become displaced from its position on the idlers attached to each of the hopper cars. The training idler assembly causes the conveyor belt to remain centered below the discharge openings of each of the hopper cars. It also avoids placing unnecessary stresses and tearing forces upon the conveyor belt. Since the training idler assembly is placed on the end sills of each of the cars, the curvature of the belt is rather gradual.

In use with the self-unloading train, the training idler assembly allows the self-unloading train to unload on curved sections of track. This increases the ability of the self-unloading train to accommodate the needs and desires of users. It is not necessary to utilize only straight sections of track on which to unload. As such, the present invention increases the ability of the self-unloading train to serve those areas of the country in which long straight sections of track are uncommon. It also allows the self-unloading train to enter many more markets and more remote areas.

The foregoing disclosure and description of the invention is illustrative and explanatory thereof. Various changes in the details of the illustrated apparatus may be made within the scope of the appended claims without departing from the true spirit of the invention. The present invention should only be limited by the following claims and their legal equivalents.

I claim:

1. A self-unloading train for bulk commodities comprising:
    a plurality of hopper cars;
    a conveyor means underlying said hopper cars and extending therebetween, said conveyor means for receiving a discharge from said hopper cars and for transferring the discharge; and
    conveyor training means positioned along said conveyor means so as to support said conveyor means, said conveyor training means for causing an angular adjustment of said conveyor means relative to an orientation of said hopper cars, said conveyor training means comprising:
    an idler assembly positioned between adjacent hopper cars of said plurality of said hopper cars, said idler assembly supporting said conveyor means, said idler assembly movable in relation to an orientation of said adjacent hopper cars.

2. The self-unloading train of claim 1, each of said plurality of hopper cars having a connector extending between adjacent hopper cars, said connector for enabling relative angular movement between said hopper cars, said conveyor training means rotatably mounted to said connector.

3. The self-unloading train of claim 1, each of said plurality of hopper cars connected by a connector to an adjacent hopper car, said idler assembly rotatably mounted to a surface of said connector.

4. The self-unloading train of claim 1, said idler assembly comprising:
    a first troughing idler assembly supporting a supply run of said conveyor means, said troughing idler assembly rotatable about a first central axis; and
    a second troughing idler assembly supporting a return run of said conveyor means, said second troughing idler assembly rotatable about a second central axis.

5. The self-unloading train of claim 4, said first troughing idler assembly flexibly connected to a first frame and said second troughing idler assembly connected to a second frame, said second frame arranged interior of said first frame, said first central axis interconnected to said second central axis, said first frame rotatable independently of said second frame.

6. The self-unloading train of claim 5, said first troughing idler assembly comprising three idlers flexibly connected in end-to-end relationship, said three idlers extending between ends of said first frame.

7. The self-unloading train of claim 5, said second troughing idler assembly comprising:
    a first idler rotatably mounted to one end of said second frame;
    a second idler rotatably mounted to another end of said second frame, said first and second idlers extending angularly downwardly from said first and second frames; and
    a roller rotatably mounted within said second frame, said roller extending between said first and second idlers.

8. The self-unloading train of claim 6, said first troughing idler assembly supported in frictional contact with said supply run of said conveyor means.

9. The self-unloading train of claim 4, said plurality of hopper cars comprising a first hopper car interconnected to a second hopper car, said first troughing idler assembly connected to said first hopper car, said second troughing idler assembly connected to said second hopper car, a relative movement of said first hopper car with respect to said second hopper car causing relative movement between said first troughing idler assembly and said second troughing idler assembly.

10. A training idler assembly for a supply run and a return run of a conveyor belt comprising:
    a first troughing idler assembly supporting the supply run of the conveyor belt, said first troughing idler assembly rotatable about an axis, said first troughing idler assembly comprising:
    a first frame having a first end and a second end, said first frame rotatable about said axis; and
    a plurality of troughing idlers flexibly interconnected together, one end of said plurality of troughing idlers connected to said first end of said first frame, another end of said plurality of troughing idlers connected to said second end of said first frame; and
    a second troughing idler assembly supporting the return run of the conveyor belt, said second troughing idler assembly rotatable about said axis, said first and second troughing idler assemblies rotatable relative to each other in relation to a curvature of the conveyor belt, said second troughing idler assembly comprising:
    a second frame having a first end and a second end, said second frame rotatable about said axis;
    a first idler rotatably mounted to said first end of said second frame, said first idler extending angularly downwardly from said first end;
    a second idler rotatably mounted to said second end of said second frame, said second idler extending angularly downwardly from said second end; and
    a roller rotatably connected to said second frame, said roller extending between said first and second idlers.

11. A training idler assembly for a supply run and a return run of a conveyor belt comprising:
    a first troughing idler assembly supporting the supply run of the conveyor belt, said first troughing idler assembly rotatable about an axis; and
    a second troughing idler assembly supporting the return run of the conveyor belt, said second troughing idler assembly rotatable about said axis, said first and second troughing idler assemblies rotatable relative to each other in relation to a curvature of the conveyor belt, said first troughing idler assembly connected to a first surface such that said first troughing idler assembly rotates relative to a movement of said first surface, said second troughing idler assembly connected to a second surface such that said second troughing idler assembly rotates relative to a movement of a second surface.

12. The training idler assembly of claim 11, said first surface being a first hopper car, said second surface being a second hopper car, said first and second training idler assemblies rotatably mounted to a connector extending between said first and second hopper cars.

13. A training idler assembly for a self-unloading train comprising:
    a first hopper car;
    a second hopper car;
    a connector extending between said first hopper car and said second hopper car, said connector allowing relative angular movement of said first and second hopper cars;
    a conveyor having a supply run and a return run, said conveyor supported underlying said first and second hopper cars so as to receive discharges therefrom; and a conveyor training means rotatably mounted to said connector, said conveyor training means supporting said conveyor, said conveyor training means for causing an angular adjustment of said conveyor relative to the angular movement of said first hopper car with respect to said second hopper car.

14. The training idler assembly of claim 13, said conveyor training means comprising:

an idler assembly rotatably mounted to said connector between said first and second hopper cars, said idler assembly supporting said supply run of said conveyor, said idler assembly in frictional engagement with said conveyor.

15. The training idler assembly of claim 14, said idler assembly comprising:

a first training idler assembly supporting said supply run of said conveyor, said first training idler assembly having a frame rotatably mounted about a vertical axis to said connector; and a second training idler assembly supporting said return run of said conveyor, said second training idler assembly having another frame rotatably mounted about said vertical axis to said connector.

16. The training idler assembly of claim 15, said first training idler assembly connected by a first strut to one of said first and second hopper cars, said second training idler assembly connected by a second strut to another of said first and second hopper cars, said first training idler assembly rotatable independently of said second training idler assembly.

* * * * *